(12) United States Patent
Kim et al.

(10) Patent No.: US 10,698,576 B2
(45) Date of Patent: Jun. 30, 2020

(54) DEVICE AND METHOD FOR DISPLAYING LAYERS OF CARTOON DATA BASED ON DETECTED CONDITIONS

(71) Applicant: NAVER CORPORATION, Seongnam-si (KR)

(72) Inventors: Hyo Kim, Seongnam-si (KR); Hyun Chul Lee, Seongnam-si (KR); Ji Han Kim, Seongnam-si (KR); Dai Hyun Lim, Seongnam-si (KR); Byoung Kwan Kim, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 76 days.

(21) Appl. No.: 15/662,735

(22) Filed: Jul. 28, 2017

(65) Prior Publication Data
US 2017/0329476 A1    Nov. 16, 2017

Related U.S. Application Data

(63) Continuation of application No. PCT/KR2015/012382, filed on Nov. 18, 2015.

(30) Foreign Application Priority Data

Jan. 29, 2015   (KR) .................. 10-2015-0014588

(51) Int. Cl.
*G06F 9/48* (2006.01)
*G06F 3/0483* (2013.01)
(Continued)

(52) U.S. Cl.
CPC ............ *G06F 3/0483* (2013.01); *G06F 3/013* (2013.01); *G06F 3/017* (2013.01); *G06F 3/0488* (2013.01)

(58) Field of Classification Search
CPC ........ G06F 3/0483; G06F 3/013; G06F 3/017; G06F 3/0488; G06Q 50/10
See application file for complete search history.

(56) References Cited

U.S. PATENT DOCUMENTS

| 7,647,175 B2 * | 1/2010 | Fateh ................... G01C 21/16 345/158 |
| 2010/0131904 A1 * | 5/2010 | Fong ..................... G06F 3/0346 715/863 |

(Continued)

FOREIGN PATENT DOCUMENTS

| JP | 530093051 A | 8/1978 |
| JP | 2013025656 A | 2/2013 |

(Continued)

OTHER PUBLICATIONS

Office Action issued in corresponding Japanese Patent application No. 2017-539272, dated Sep. 25, 2018.
(Continued)

*Primary Examiner* — Jennifer N To
*Assistant Examiner* — KC Chen
(74) *Attorney, Agent, or Firm* — Greer Burns & Crain Ltd.

(57) ABSTRACT

The present invention relates to a device and method for displaying cartoon data. The device for displaying cartoon data includes a storage unit configured to store a first layer as a main cut of cartoon data and second to $N^{th}$ layers as sub cuts having additional information to be added to the main cut, wherein the first to $N^{th}$ layers are displayed in a display region of a user terminal, a detection unit configured to detect a surrounding environment of the user terminal or data input to the user terminal, and a control unit configured to initiate a display of any one of the second to $N^{th}$ layers in (Continued)

the display region of the user terminal according to a detection result of the detection unit.

17 Claims, 17 Drawing Sheets

(51) Int. Cl.
  *G06F 3/01* (2006.01)
  *G06F 3/0488* (2013.01)

(56) References Cited

U.S. PATENT DOCUMENTS

| | | | | |
|---|---|---|---|---|
| 2013/0002425 | A1* | 1/2013 | Hatch | G01H 3/12 340/540 |
| 2013/0027302 | A1 | 1/2013 | Iwaizumi et al. | |
| 2013/0083060 | A1* | 4/2013 | Lawson | G09G 5/14 345/630 |
| 2013/0227705 | A1* | 8/2013 | Yoon | G06F 21/60 726/27 |
| 2013/0342568 | A1* | 12/2013 | Ambrus | G09G 3/003 345/633 |
| 2014/0033116 | A1* | 1/2014 | Jakobs | G06F 16/9024 715/788 |
| 2014/0176764 | A1* | 6/2014 | Nakamura | G06K 9/00308 348/231.99 |
| 2014/0282159 | A1* | 9/2014 | Lee | G06F 3/0481 715/768 |

FOREIGN PATENT DOCUMENTS

| | | |
|---|---|---|
| KR | 10-2008-0033033 | 4/2008 |
| KR | 10-2009-0076540 | 7/2009 |
| KR | 10-2009-0084123 | 8/2009 |
| KR | 10-2014-0078083 | 6/2014 |
| WO | 2014107635 A2 | 7/2014 |

OTHER PUBLICATIONS

Int'l. Search Report issued in Int'l. App. No. PCT/KR2015/012382, dated Feb. 29, 2016.

* cited by examiner

DEVICE AND METHOD FOR DISPLAYING LAYERS OF CARTOON DATA BASED ON DETECTED CONDITIONS

CROSS-REFERENCE TO RELATED APPLICATIONS

This is a continuation application of International Application No. PCT/KR2015/012382, filed Nov. 18, 2015, which claims benefit of Korean Patent Application No. 10-2015-0014588, filed Jan. 29, 2015.

BACKGROUND OF THE INVENTION

Field of Invention

The present invention relates to a device and method for displaying cartoon data.

Description of Related Art

A cartoon is a picture intended to satirize or criticize life or society by exaggerating or omitting the features of an object using humor, caricature, satire, etc. Cartoons are classified into various fields, e.g., a romance cartoon, a martial arts cartoon, an action cartoon, a comic cartoon, a sports cartoon, a science fiction (SF) cartoon, etc., according to the contents thereof. A cartoon may show complex human attitudes using a visual system of pictures (images) and characters (text) and is thus more effective to draw the attention of readers than a general book only containing characters.

Recently, with the advancement in communication technology, cartoons have been provided not only through cartoon books but also via the Internet or the like.

The foregoing background is technical information the inventors possessed for or obtained in the course of the present invention, and thus may not be publicly known before the filing of this application.

The present invention is designed to address the foregoing problems and/or limitation, and an objective of the present invention is to provide cartoon data having various effects according to a surrounding environment of a user terminal on which the cartoon data is displayed, thereby arousing interest in the cartoon data of a user who is viewing the cartoon data.

Also, another objective of the present invention is to provide cartoon data having various effects according to data input to a user terminal on which the cartoon data is displayed, thereby arousing interest in the cartoon data of a user who is viewing the cartoon data.

BRIEF SUMMARY OF THE INVENTION

A cartoon data display device according to an embodiment of the present invention may include a storage unit configured to store a first layer as a main cut of cartoon data displayed in the display region of a user terminal and also store second to $N^{th}$ layers as different sub cuts including one or more stories added to the main cut; a detection unit configured to detect a surrounding environment of the user terminal or data input to the user terminal; and a control unit configured to start a display of any one of the second to $N^{th}$ layers in the display region of the user terminal according to a detection result of the detection unit.

The detection unit may include a first detection unit configured to detect an illuminance around the user terminal, and the control unit may start the display of the second layer in the display region of the user terminal when the illuminance detected by the first detection unit is less than or equal to a reference illuminance.

The detection unit may include a second detection unit configured to detect noise around the user terminal, and the control unit may start the display of the third layer in the display region of the user terminal when the noise detected by the second detection unit is greater than a reference noise level.

The detection unit may include a third detection unit configured to track eyes of a user looking at the user terminal, and the control unit may start the display of the fourth layer in the display region of the user terminal when an eye tracking result of the third detection unit is that the eyes of the user are fixed in a reference region.

The detection unit may include a fourth detection unit configured to detect a gesture of a user input to the user terminal, and the control unit may start the display of the fifth layer in the display region of the user terminal when a gesture detection result of the fourth detection unit is that the gesture has changed from a first gesture to a second gesture.

The detection unit may include a fifth detection unit configured to detect a tilt of the user terminal, and the control unit may start the display of the sixth layer in the display region of the user terminal when the tilt detected by the fifth detection unit is greater than a reference tilt.

The detection unit may include a sixth detection unit configured to detect an acceleration of the user terminal, and the control unit may start the display of the seventh layer in the display region of the user terminal when the acceleration detected by the sixth detection unit is greater than a reference acceleration.

The detection unit may include a seventh detection unit configured to detect temperature or humidity around the user terminal, and the control unit may start the display of the eighth layer in the display region of the user terminal when the temperature or humidity detected by the seventh detection unit is greater than a reference temperature or humidity level.

The storage unit may store the first layer as the main cut of the cartoon data displayed in the display region of the user terminal and also store the second to $N^{th}$ layers as the sub cuts including one or more stories to be added to the main cut, and the control unit may combine and display the first layer and one or more of the second to $N^{th}$ layers in the display region of the user terminal according to a detection result of the detection unit.

A cartoon data display method according to an embodiment of the present invention may include storing a first layer as a main cut of cartoon data displayed in a display region of a user terminal and also storing second to $N^{th}$ layers as different sub cuts including one or more stories added to the main cut, by a storage unit; detecting, by a detection unit, a surrounding environment of the user terminal or data input to the user terminal; and starting, by the control unit, a display of any one of the second to $N^{th}$ layers in the display region of the user terminal according to a detection result of the detection unit.

The detecting may include detecting, by a first detection unit, an illuminance around the user terminal, and the starting may include starting the display of the second layer in the display region of the user terminal when the illuminance detected by the first detection unit is less than or equal to a reference illuminance.

The detecting may include detecting, by a second detection unit, noise around the user terminal, and the starting may include starting the display of the third layer in the display region of the user terminal when the noise detected by the second detection unit is greater than a reference noise level.

The detecting may include tracking, by a third detection unit, eyes of a user looking at the user terminal, and the starting may include starting the display of the fourth layer in the display region of the user terminal when an eye tracking result of the third detection unit is that the eyes of the user are fixed in a reference region.

The detecting may include detecting, by a fourth detection unit, a gesture of a user input to the user terminal, and the starting may include starting the display of the fifth layer in the display region of the user terminal when a gesture detection result of the fourth detection unit is that the gesture has changed from a first gesture to a second gesture.

The detecting may include detecting, by a fifth detection unit, a tilt of the user terminal, and the starting may include starting the display of the sixth layer in the display region of the user terminal when the tilt detected by the fifth detection unit is greater than a reference tilt.

The detecting may include detecting, by a sixth detection unit, a movement state of the user terminal, and the starting may include starting the display of the seventh layer in the display region of the user terminal when the acceleration detected by the sixth detection unit is greater than a reference acceleration.

The detecting may include detecting, by a seventh detection unit, a temperature or humidity around the user terminal, and the starting may include starting the display of the eighth layer in the display region of the user terminal when the temperature or humidity detected by the seventh detection unit is greater than a reference temperature or humidity level.

The storing may include storing the first layer as the main cut of the cartoon data displayed in the display region of the user terminal and also storing the second to $N^{th}$ layers as the sub cuts including one or more stories to be added to the main cut, and the starting may include combining and displaying the first layer and one or more of the second to $N^{th}$ layers in the display region of the user terminal according to a detection result of the detection unit.

In addition, other methods and devices for implementing the present invention and a computer-readable recording medium having a computer program recorded thereon to execute the methods may be further provided.

The above and other aspects, features, and advantages of the present invention will become apparent from the following description taken in conjunction with the accompanying drawings, claims, and detailed description.

According to embodiments, it is possible to provide cartoon data having various effects according to a surrounding environment of a user terminal on which the cartoon data is displayed, thereby arousing interest in the cartoon data of a user who is viewing the cartoon data.

It is also possible to provide cartoon data having various effects according to data input to a user terminal on which the cartoon data is displayed, thereby arousing interest in the cartoon data of a user who is viewing the cartoon data.

DETAILED DESCRIPTION OF THE INVENTION

Figure 1:
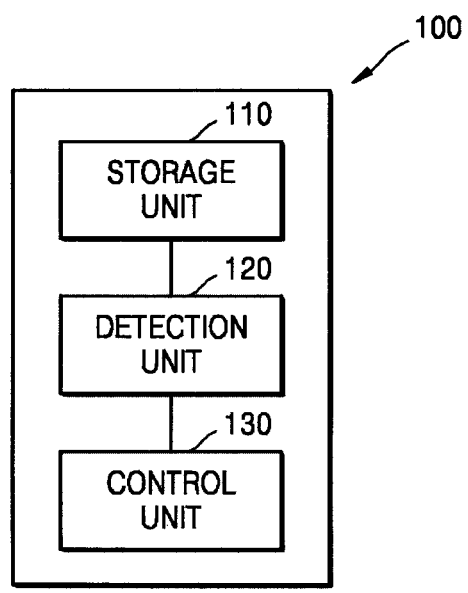
FIG. 1 is a diagram schematically illustrating a device for displaying cartoon data according to an embodiment of the present invention.

Advantages and features of the present invention and implementation methods thereof will be clarified through following embodiments described with reference to the accompanying drawings. However, the present invention is not limited to the following embodiments and may be embodied in different ways. Additionally, it should be understood that the present invention covers all modifications, equivalents, and alternatives falling within the spirit and scope of the invention. The following embodiments are provided so that this disclosure will be thorough and complete and will fully convey the concept of the present invention to those skilled in the art. In the description of embodiments, certain detailed explanations of a related art are omitted when it is deemed that they may unnecessarily obscure the essence of the invention.

The terminology used herein is for the purpose of describing particular embodiments only and is not intended to limit the invention. As used herein, the singular forms "a," "an," and "the" are intended to include the plural forms as well, unless the context clearly indicates otherwise. The terms "comprises," "comprising," "includes," "including," and/or "having," when used herein, should be understood as specifying the presence of stated features, integers, steps, operations, elements, components, and/or groups thereof while not precluding the presence or addition of one or more other features, integers, steps, operations, elements, components, and/or groups thereof. Relational terms such as first, second, and the like may be used for describing various elements, but the elements are not limited by the terms. These terms are only used to distinguish one element from another.

In the present disclosure, the term 'cartoon data' means data created by a cartoonist and may include the amount of cartoon data to be provided as one episode. A piece of the cartoon data may include at least one cut. Here, the term 'cut' means data containing one scene, and may include at least one layer including an image or text. In cartoon data, each of cuts may be individually included in the form of an image file. The cartoon data may be classified according to authors, episodes, works, days of the week, etc. and may include works that were not published any longer. In the cartoon data, the first cut to the last cut may be displayed within one page or may be divided and displayed on a plurality of pages. The term 'display region' should be understood to include a display region of a user terminal, on which all of or some of pieces of cartoon data are displayed.

Hereinafter, embodiments of the present invention will be described in detail with reference to the accompanying drawings, and the same or similar elements will be designated with the same numeral references regardless of the numerals in the drawings, and redundant descriptions thereof will be omitted.

FIG. 1 is a diagram schematically illustrating a cartoon data display device 100 for displaying cartoons on the display region of a user terminal according to an embodiment of the present invention. Referring to FIG. 1, the cartoon data display device 100 includes a storage unit 110, a detection unit 120, and a control unit 130.

The storage unit 110 stores a first layer as a main cut of cartoon data displayed in a display region of a user terminal and also store second to $N^{th}$ layers as different sub cuts, each of which includes one or more stories added to the main cut.

Here, each of the second to $N^{th}$ layers may be an additional layer that is stored in addition to the first layer, which is the main cut. The additional layer cannot be displayed when a detection signal is not received from the detection unit 120 and may be displayed when the detection signal is received from the detection unit 120.

Also, the second to $N^{th}$ layers, which are the additional layers, may include different images or text, and may create a modified story or a new story when compared to the first layer, which is the main cut. For example, the second to $N^{th}$ layers may be composed of a foreshadowing item that offers a clue to questions raised in an original story composed of the first layer, a story including a new item (e.g., a fear item that expresses a ghost) added to the original story, or a story including an advertisement item for a character included in the original story. The second to $N^{th}$ layers are not limited thereto and may be variously directed depending on an artist's intent. Also, each of the second to $N^{th}$ layers may be composed of a single cut displayed in the display region of the user terminal.

As an alternative embodiment, the storage unit 110 may store a first layer as a main cut of cartoon data displayed in the display region of a user terminal and also store second to $N^{th}$ layers as different sub cuts, each of which includes one or more stories to be added to the main cut. In the above example, each of the first to $N^{th}$ layers is configured as a single cut displayed in the display region of the user terminal. However, this embodiment may have a difference in that a result of combining the first layer, which is the main cut, and any one of the second to $N^{th}$ layers, which are the sub cuts, is configured as a single cut displayed in the display region of the user terminal.

The storage unit 110 may also have a function of temporarily or permanently storing data processed by the control unit 130. Here, the storage unit 110 may include magnetic storage media or flash storage media. However, the scope of the present invention is not limited thereto.

Figure 2:
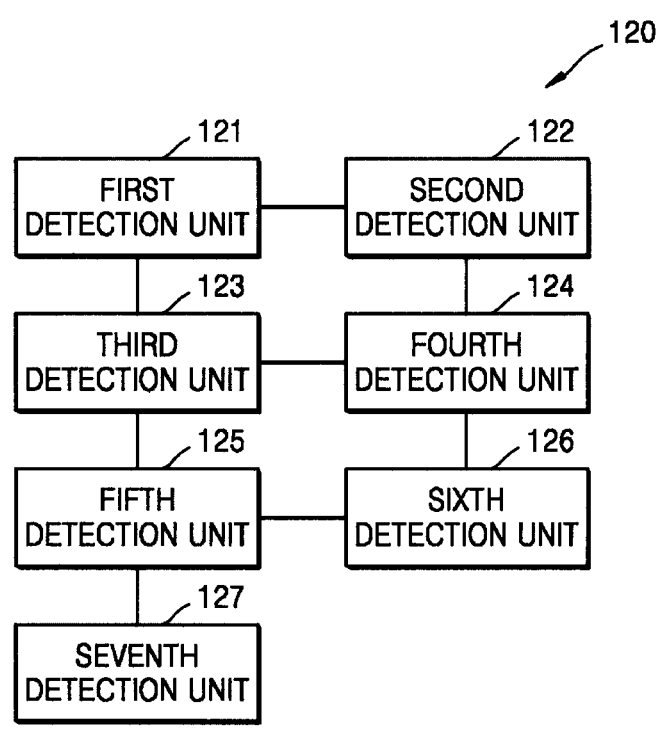
FIG. 2 is a diagram illustrating a detailed configuration of a detection unit according to an embodiment of the present invention.

The detection unit 120 detects the surrounding environment of the user terminal or data input to the user terminal. FIG. 2 is a diagram illustrating a detailed configuration of the detection unit 120 according to an embodiment of the present invention. Referring to FIG. 2, the detection unit 120 may include first to seventh detection units 121 to 127. Depending on the selection of a user, the detection unit 120 may activate one or more of the first to seventh detection units 121 to 127 or may activate or deactivate all of the first to seventh detection units 121 to 127. When all of the first to seventh detection units 121 to 127 are activated according to the selection of the user, priorities may be set for the first to seventh detection units 121 to 127. For example, when the priorities are set in descending order from the first detection unit 121 to the seventh detection unit 127, the detection result of the first detection unit 121 may be considered as having the highest priority.

The first detection unit 121 may include an illuminance detector configured to detect an illuminance around the user terminal. The first detection unit 121 may detect an illuminance corresponding to a quantity that represents intensity of light received in a predetermined region of the user terminal as luminous flux spread throughout the region. The illuminance detection result of the first detection unit 121 may be transmitted to the control unit 130, and the control unit 130 may determine whether the illuminance around the user terminal is high or low on the basis of the illuminance detection result. A reference illuminance (e.g., 100 lx) is stored in the control unit 130. The control unit 130 may determine that the illuminance is high when the illuminance detection result of the first detection unit 121 is greater than 100 lx and may determine that the illuminance is low when the illuminance detection result is less than or equal to 100 lx.

The second detection unit 122 may include a noise detector configured to detect noise around the user terminal. The second detection unit 122 may detect the noise around the user terminal by means of a microphone (not shown) included in the user terminal. The noise detection result of the second detection unit 122 is transmitted to the control unit 130, and the control unit 130 may determine whether the noise around the user terminal is high or low on the basis of the noise detection result. A reference noise level (e.g., 60 dB) is stored in the control unit 130. The control unit 130 may determine that the noise is high when the noise detection result of the second detection unit 122 is greater than or equal to 60 dB and may determine that the noise is low when the noise detection result is less than 60 dB.

The third detection unit 123 may include an eye tracking unit configured to track the eyes of a user looking at the user terminal. The third detection unit 123 may extract eye-tracking information by tracking the eyes of the user in a user image input through a camera (not shown) included in the user terminal. Here, the eye-tracking information may include time information regarding a time during which the eyes of the user are fixed and position information regarding a position on which the eyes of the user are concentrated. That is, the third detection unit 123 may capture an image by means of the camera and recognize the eyes of the user to extract the time information and position information regarding the eyes of the user. The time information extraction result of the third detection unit 123 may be transmitted to the control unit 130, and the control unit 130 may determine whether the eyes of the user are fixed in the display region, which is a reference region, for a certain time, for example, 1 second or longer, on the basis of the time information extraction result.

The fourth detection unit 124 may include a gesture detection unit configured to detect a gesture of the user that is input to the user terminal. Here, the gesture refers to a hand sign or the like that is input by the user to control the user terminal. For example, the gesture may include panning, scrolling, flicking, and the like. Here, the panning, scrolling, and flicking refer to an action of the user touching a region of the user terminal with a finger or a touch tool (e.g., a stylus) and sliding the finger or the touch tool in a certain direction. The panning indicates an action of the user touching a region of the user terminal with a finger or a touch tool and then dragging the finger or the touch tool (without lifting it). There is no limitation with respect to a moving direction or time. In this case, the panning action is recognized until the finger or the touch tool is lifted. The scrolling indicates an action of the user touching a region of the user terminal with a finger or a touch tool and then dragging the finger or the touch tool along a straight line. There is no limitation with respect to a moving time, but the dragging is limited to a straight line. Accordingly, the scrolling action is recognized until the finger or the touch tool is lifted. The flicking, which is similar to the scrolling and is a more limited scrolling action, indicates an action of the user quickly dragging a finger or a touch tool in one direction. Furthermore, the gesture may include a direction key input or a mouse input that is input by the user. The gesture may include a first gesture and a second gesture. The first gesture may include a gesture having first directionality, for example, a gesture moving upward while touching any point, and the second gesture may include a gesture having second directionality, for example, a gesture moving downward while touching any point. The gesture detection result of the fourth detection unit 124 is transmitted to the control unit 130, and the control unit 130 may determine whether the gesture of the user has changed from the first gesture to the second gesture on the basis of the gesture detection result.

The fifth detection unit 125 may include a tilt detector configured to detect a tilt of the user terminal. The fifth detection unit 125 may detect the tilt of the user terminal by means of a vibration sensor included in the user terminal. Here, the vibration sensor, which is called a motion action provider (MAP), is a sensor used to detect terrestrial magnetism to detect an azimuth angle using a geomagnetic field, detect a motion acceleration to measure a velocity and a relative location, detect a gravity acceleration to detect a tilt, or the like. The fifth detection unit 125 may detect changes in tilt and motion of the user terminal by detecting acceleration by means of the vibration sensor. That is, vibration sensors for detecting a gravity acceleration may be installed on three axes, i.e., an x axis, a y axis, and a z axis of the user terminal, and the fifth detection unit 125 may measure inertia caused by the vibration sensors, which are installed on the three axes, being moved according to a motion of a user who is gripping the user terminal, and may calculate an acceleration and a deceleration by using a time during which the inertia maintains a maximum value or a minimum value. When the acceleration and the deceleration are calculated, the fifth detection unit 125 detects a change in the tilt of the user terminal by performing integration on the acceleration and the deceleration. As another embodiment, the fifth detection unit 125 may detect a tilt of the user terminal by means of a gravity sensor included in the user terminal. The fifth detection unit 125 may measure an angle between a gravity direction measured by the gravity sensor and a reference direction, and perform differentiation on the angle to detect the tilt of the user terminal. Here, the reference direction is a predetermined direction for determining to what degree the user terminal is tilted from the gravity direction. The reference direction may be changed and set in various ways. As an example, the reference direction of the user terminal may be set to be a direction perpendicular to a horizontal axis direction. Alternatively, the reference direction may be set to be the horizontal axis direction or a vertical axis direction of the user terminal or a direction perpendicular to the vertical axis direction. The tilt detection result of the fifth detection unit 125 is transmitted to the control unit 130, and the control unit 130 may determine in which direction and to what degree the user terminal is tilted on the basis of the tilt detection result. A reference tilt, for example, 90 degrees, may be stored in the control unit 130.

The sixth detection unit 126 may include an acceleration detection unit configured to detect a movement state of the user terminal. The sixth detection unit 126 may detect the movement state, i.e., an acceleration of the user terminal, by means of the above-described vibration sensor. The movement state detection result of the sixth detection unit 126 is transmitted to the control unit 130, and the control unit 130 may determine whether the user terminal is moving on the basis of the movement state detection result. Also, a reference movement state, i.e., a reference acceleration, may be stored in the control unit 130.

The seventh detection unit 127 may include a temperature detector or a humidity detector configured to detect a temperature or humidity around the user terminal. The seventh detection unit 127 may detect the temperature or humidity around the user terminal by means of a thermometer or a hygrometer included in the user terminal. The temperature or humidity detection result of the seventh detection unit 127 is transmitted to the control unit 130, and the control unit 130 may determine a temperature or humidity around the user terminal on the basis of the temperature or humidity detection result. Also, a reference temperature or humidity level may be stored in the control unit 130.

In this embodiment, the detection unit 120 is limited to the first to seventh detection units 121 to 127. However, the present invention is not limited thereto, and any element configured to detect a surrounding environment of the user terminal or data input to the user terminal may be included in the detection unit 120.

Referring back to FIG. 1, the control unit 130 may start a display of any one of the second to $N^{th}$ layers in the display region of the user terminal according to a detection result of the detection unit 120.

The control unit 130 may start the display of the second layer in the display region of the user terminal when the illuminance detection result of the first detection unit 121 is less than or equal to the reference illuminance. The control unit 130 may start the display of the third layer in the display region of the user terminal when the noise detection result of the second detection unit 122 is greater than the reference noise level. The control unit 130 may start the display of the fourth layer in the display region of the user terminal when the eye tracking result of the third detection unit 123 is that the eyes of the user are fixed in the reference region. The control unit 130 may start the display of the fifth layer in the display region of the user terminal when the gesture detection result of the fourth detection unit 124 is that a gesture has changed from the first gesture to the second gesture. The control unit 130 may start the display of the sixth layer in the display region of the user terminal when the tilt detection result of the fifth detection unit is greater than the reference tilt. The control unit 130 may start the display of the seventh layer in the display region of the user terminal when the movement state detection result of the sixth detection unit 126 is greater than the reference movement state. The control unit 130 may start the display of the eighth layer in the display region of the user terminal when the temperature or humidity detection result of the seventh detection unit is greater than the reference temperature or humidity level.

Here, the control unit 130 may include any type of device capable of processing data, such as a processor configured to control the overall operation of the cartoon data display device 100. Here, for example, the processor may refer to a hardware built-in data processing device having a circuit physically structured to perform a function expressed in a code or instructions included in a program. For example, the hardware built-in data processing device may include, but is not limited to, a microprocessor, a central processing unit (CPU), a processor core, a multiprocessor, an application-specific integrated circuit (ASIC), a field programmable gate array (FPGA), etc.

As an alternative embodiment, the control unit 130 may combine and display the first layer and one or more of the second to $N^{th}$ layers in the display region of the user terminal according to a detection result of the detection unit 120.

The control unit 130 may combine and display the first layer and the second layer in the display region of the user terminal when the illuminance detection result of the first detection unit 121 is less than or equal to the reference illuminance. The control unit 130 may combine and display the first layer and the third layer in the display region of the user terminal when the noise detection result of the second detection unit 122 is greater than the reference noise level. The control unit 130 may combine and display the first layer and the fourth layer in the display region of the user terminal when the eye tracking result of the third detection unit 123 is that the eyes of the user are fixed in the reference region. The control unit 130 may combine and display the first layer and the fifth layer in the display region of the user terminal when the gesture detection result of the fourth detection unit 124 is that a gesture has changed from the first gesture to the second gesture. The control unit 130 may combine and display the first layer and the sixth layer in the display region of the user terminal when the tilt detection result of the fifth detection unit is greater than the reference tilt. The control unit 130 may combine and display the first layer and the seventh layer in the display region of the user terminal when the movement state detection result of the sixth detection unit 126 is greater than the reference movement state. The control unit 130 may combine and display the first layer and the eighth layer in the display region of the user terminal when the temperature or humidity detection result of the seventh detection unit is greater than the reference temperature or humidity level.

Figure 3:
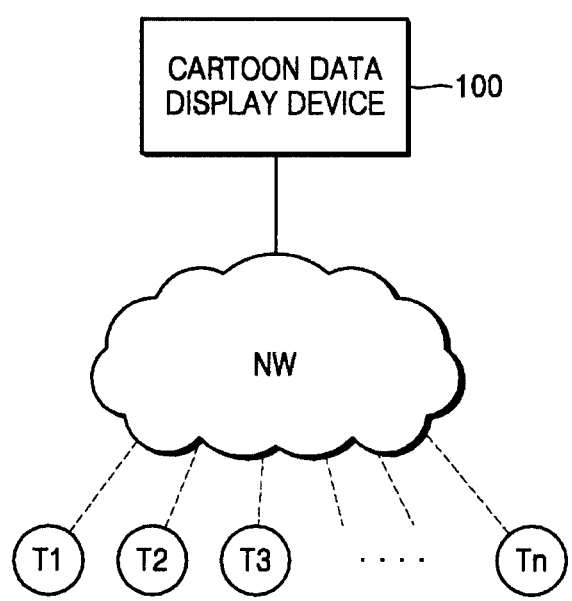
FIG. 3 is a diagram illustrating a relationship of a user terminal and the cartoon data display device of FIG. 1 according to an embodiment of the present invention.

FIG. 3 is a diagram illustrating a relationship of a user terminal and the cartoon data display device of FIG. 1 according to an embodiment of the present invention. Referring to FIG. 3, the cartoon data display device 100 may be connected to a plurality of user terminals T1, T2, T3, . . . , and Tn over a network NW including a wireless and/or a wired communication network such as the Internet and/or an intranet. Here the communication network may be an apparatus including hardware and software needed to transmit and receive signals such as a control signal or a data signal through wired/wireless connection with another network apparatus. The cartoon data display device 100 may be connected to the network NW while being distinct and separate from the user terminals T1, T2, T3, . . . , and Tn.

Figure 4:
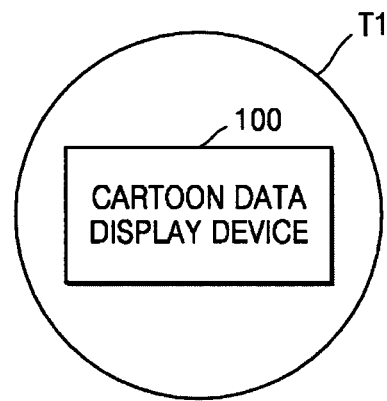
FIG. 4 is a diagram illustrating a relationship of a user terminal and the cartoon data display device of FIG. 1 according to another embodiment of the present invention.

FIG. 4 is a diagram illustrating a relationship of a user terminal and the cartoon data display device of FIG. 1 according to another embodiment of the present invention. Referring to FIG. 4, the cartoon data display device 100 may be included in the user terminal T1. Although not shown, the cartoon data display device 100 may be included in a terminal of each user. The cartoon data display device 100 according to this embodiment may be included in the user terminal T1 in various ways. As a detailed embodiment, the cartoon data display device 100 may be installed in a terminal of each user through the network NW. For example, the cartoon data display device 100 may be installed in the user terminal T1 in the form of a single application. As another detailed embodiment, the cartoon data display device 100 may be installed in the user terminal T1 in an offline manner. However, this is merely an example, and the present invention is not limited thereto. The cartoon data display device 100 may be installed in the user terminal T1 in various ways.

Figure 5:
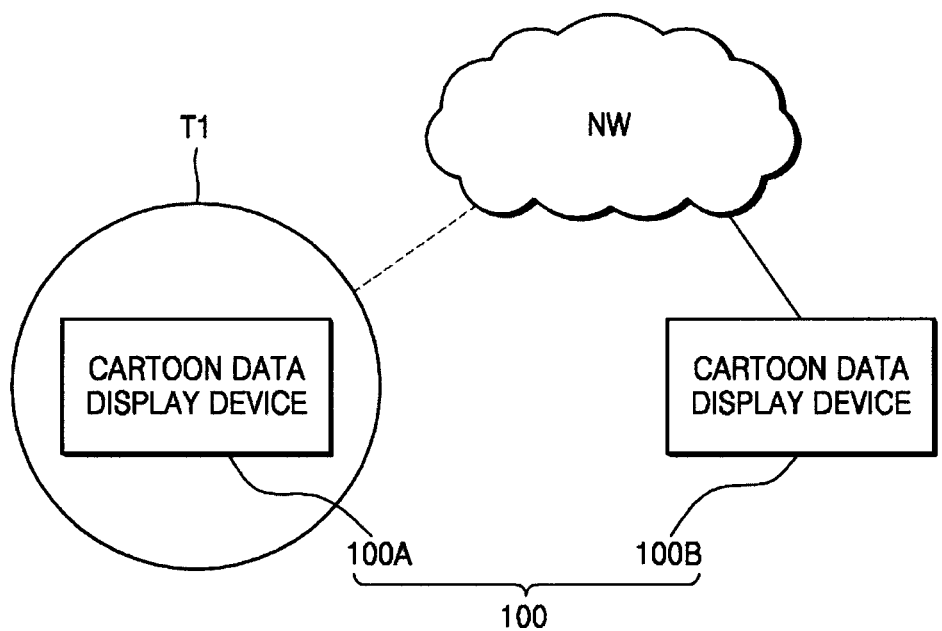
FIG. 5 is a diagram illustrating a relationship of a user terminal and the cartoon data display device of FIG. 1 according to still another embodiment of the present invention.

FIG. 5 is a diagram illustrating a relationship of a user terminal and the cartoon data display device of FIG. 1 according to still another embodiment of the present invention. Referring to FIG. 5, a portion 100A of the cartoon data display device 100 may be included in the user terminal T1, and another portion 100B may be connected to the user terminal T1 over the network NW.

For example, the portion 100A included in the user terminal T1 may include the detection unit 120, which is one of the members of the cartoon data display device 100 shown in FIGS. 1 and 2. A method in which the portion 100A of the cartoon data display device 100 is included in the user terminal T1 is the same as that described in the embodiment of FIG. 4, and thus a detailed description thereof will be omitted. The portion 100B connected to the user terminal T1 over the network NW may include the storage unit 110 and the control unit 130, which are some of the members of the cartoon data display device 100 shown in FIGS. 1 and 2.

An example in which the storage unit 110 and the control unit 130 of the cartoon data display device 100 are connected as the portion 100B to the user terminal T1 over the network NW has been described in this embodiment. However, that is just an embodiment and the present invention is not limited thereto. That is, any one of the plurality of members included in the cartoon data display device 100 may be selectively connected to the user terminal T1 over the network NW.

Figure 6:
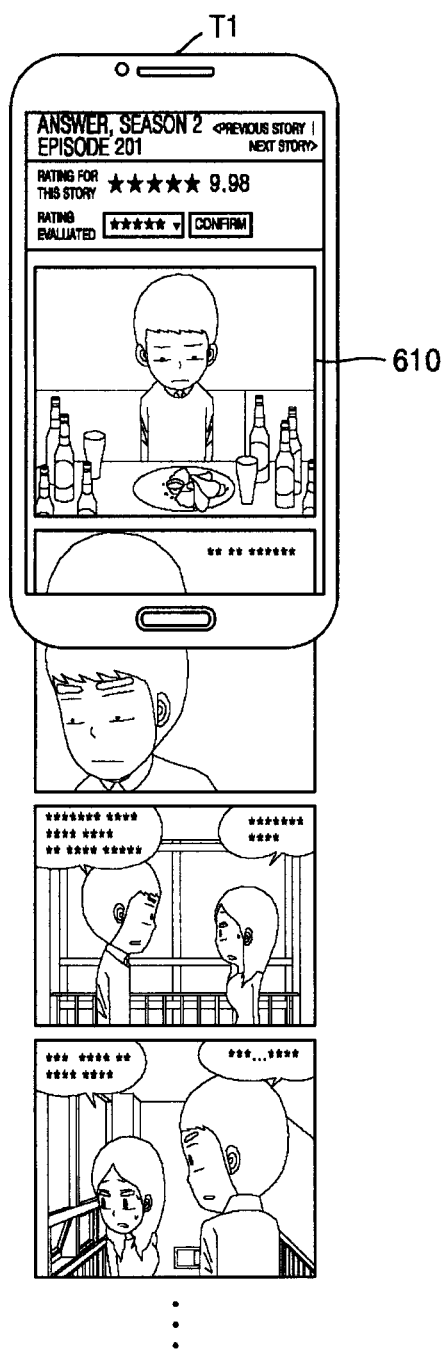
FIGS. 6-8, 9A-9D and 10A-10D are example diagrams showing screens associated with information provided to a user terminal by a cartoon data display device according to an embodiment of the present invention.

FIG. 6 is an example diagram of a screen associated with cartoon data provided to the user terminal T1 by the cartoon data display device 100 according to an embodiment of the present invention. Referring to FIG. 6, cartoon data corresponding to the first layer, which is the main cut, is shown in the display region 610 of the user terminal T1.

Figure 7:
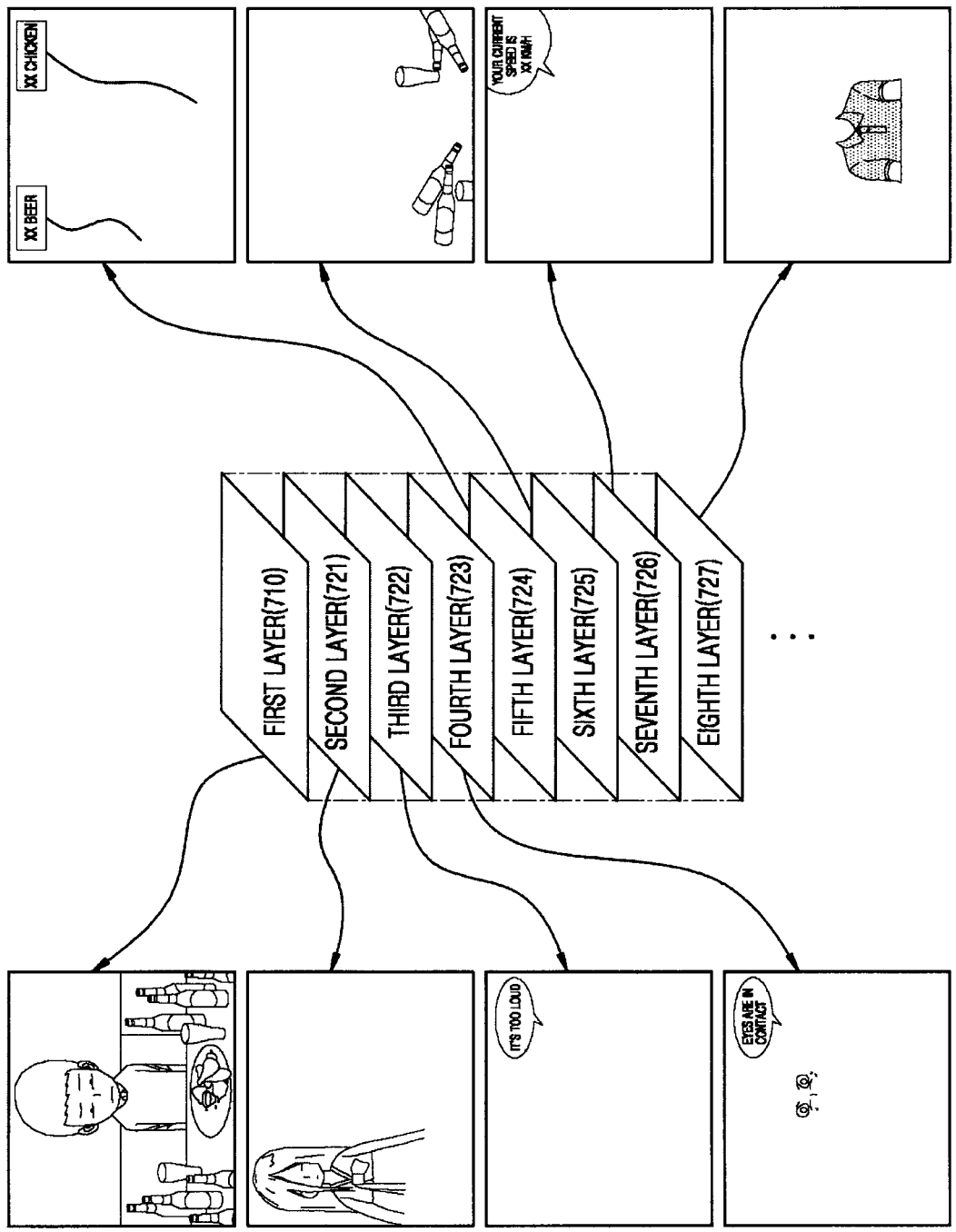

FIG. 7 is an example diagram of a screen associated with cartoon data of the first to eighth layers including the same arbitrary cut provided to the user terminal T1 by the cartoon data display device 100 according to an embodiment of the present invention. Referring to FIG. 7, for the same cut, a first layer 710, which is a main cut, or any one of second to eighth layers 721 to 727, which are sub cuts, may be displayed on the user terminal T1. Here, the first layer 710 may be a main cut that is displayed by default in the display region 610 of the user terminal T1. Alternatively, any one of the second to eighth layers 721 to 727 may be displayed in the display region 610 according to a surrounding environment of the user terminal T1 or data input to the user terminal T1.

The second layer 721 shows a sub cut displayed in the display region 610 instead of the first layer when an illuminance around the user terminal T1 is less than or equal to the reference illuminance. Here, the second layer 721 is not limited to the shown image and may be embodied as various images and/or text according to an artist's intent.

The third layer 722 shows a sub cut displayed in the display region 610 instead of the first layer when noise around the user terminal T1 is greater than the reference noise level. Here, the third layer 722 is not limited to the shown image and may be embodied as various images and/or text according to an artist's intent.

The fourth layer 723 shows a sub cut displayed in the display region 610 instead of the first layer when an eye tracking result for the user terminal T1 is that the eyes of the user are fixed in the reference region, that is, the display region 610. Here, the fourth layer 723 is not limited to the shown image and may be embodied as various images and/or text according to an artist's intent.

The fifth layer 724 shows a sub cut displayed in the display region 610 instead of the first layer when a gesture detection result for the user terminal T1 is that a gesture has changed from the first gesture to the second gesture. Here, the fifth layer 724 is not limited to the shown image and may be embodied as various images and/or text according to an artist's intent.

The sixth layer 725 shows a sub cut displayed in the display region 610 instead of the first layer when a tilt detection result for the user terminal T1 is greater than the reference tilt. Here, the sixth layer 725 is not limited to the shown image and may be embodied as various images and/or text according to an artist's intent.

The seventh layer 726 shows a sub cut displayed in the display region 610 instead of the first layer when a movement state detection result for the user terminal T1 is greater than the reference acceleration. Here, the seventh layer 726 is not limited to the shown image and may be embodied as various images and/or text according to an artist's intent.

The eighth layer 727 shows a sub cut displayed in the display region 610 instead of the first layer when a detection result for temperature or humidity around the user terminal T1 is greater than the reference temperature or humidity level. Here, the eighth layer 727 is not limited to the shown image and may be embodied as various images and/or text according to an artist's intent.

Figure 8:
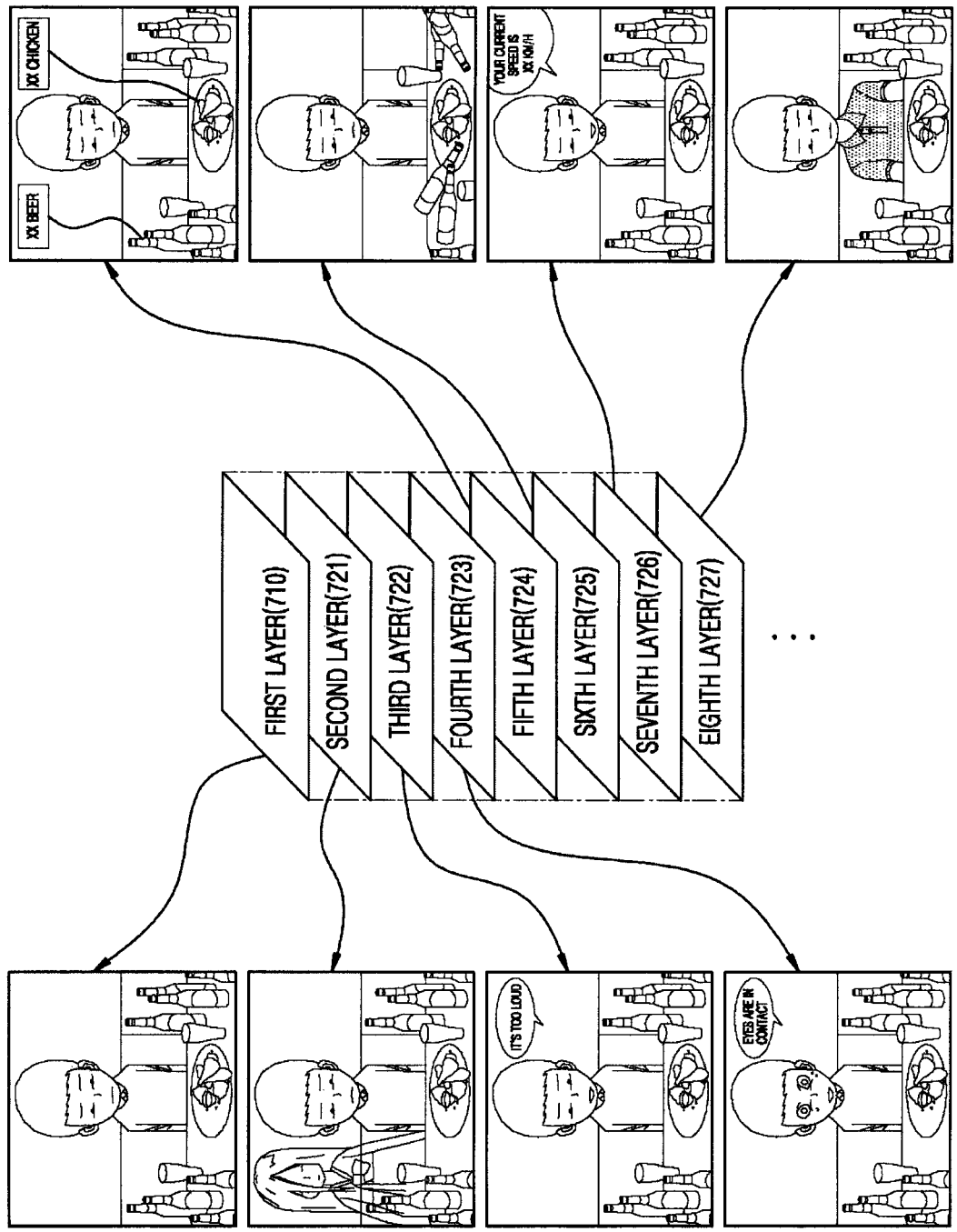

FIG. 8 is an example diagram of a screen showing cartoon data of the first to eighth layers including the same arbitrary cut provided to the user terminal T1 by the cartoon data display device 100 according to another embodiment of the present invention. Referring to FIG. 8, for the same cut, the first layer 710, which is a main cut, may be displayed on the user terminal T1, or the first layer 710 and any one of the second to eighth layers 721 to 727 may be combined and displayed on the user terminal T1.

The second layer 721 shows a sub cut to be combined with the first layer when an illuminance around the user terminal T1 is less than or equal to the reference illuminance. The first layer and the second layer 721 may be combined and displayed in the display region 610. Here, the second layer 721 is not limited to the shown image and may be embodied as various images and/or text according to an artist's intent.

The third layer 722 shows a sub cut to be combined with the first layer when noise around the user terminal T1 is greater than the reference noise. The first layer and the third layer 722 may be combined and displayed in the display region 610. Here, the third layer 722 is not limited to the shown image and may be embodied as various images and/or text according to an artist's intent.

The fourth layer 723 shows a sub cut to be combined with the first layer when an eye tracking result for the user terminal T1 is that the eyes of the user are fixed in the reference region, that is, the display region 610. The first layer and the fourth layer 723 may be combined and displayed in the display region 610. Here, the fourth layer 723 is not limited to the shown image and may be embodied as various images and/or text according to an artist's intent.

The fifth layer 724 shows a sub cut to be combined with the first layer when a gesture detection result for the user terminal T1 is that a gesture has changed from the first gesture to the second gesture. The first layer and the fifth layer 724 may be combined and displayed in the display region 610. Here, the fifth layer 724 is not limited to the shown image and may be embodied as various images and/or text according to an artist's intent.

The sixth layer 725 shows a sub cut to be combined with the first layer when a tilt detection result for the user terminal T1 is greater than the reference tilt. The first layer and the sixth layer 725 may be combined and displayed in the display region 610. Here, the sixth layer 725 is not limited to the shown image and may be embodied as various images and/or text according to an artist's intent.

The seventh layer 726 shows a sub cut to be combined with the first layer when a movement state detection result for the user terminal T1 is greater than the reference acceleration. The first layer and the seventh layer 726 may be combined and displayed in the display region 610. Here, the seventh layer 726 is not limited to the shown image and may be embodied as various images and/or text according to an artist's intent.

The eighth layer 727 shows a sub cut to be combined with the first layer when a detection result for temperature or humidity around the user terminal T1 is greater than the reference temperature or humidity level. The first layer and the eighth layer 727 may be combined and displayed in the display region 610. Here, the eighth layer 727 is not limited to the shown image and may be embodied as various images and/or text according to an artist's intent.

Figure 9A:
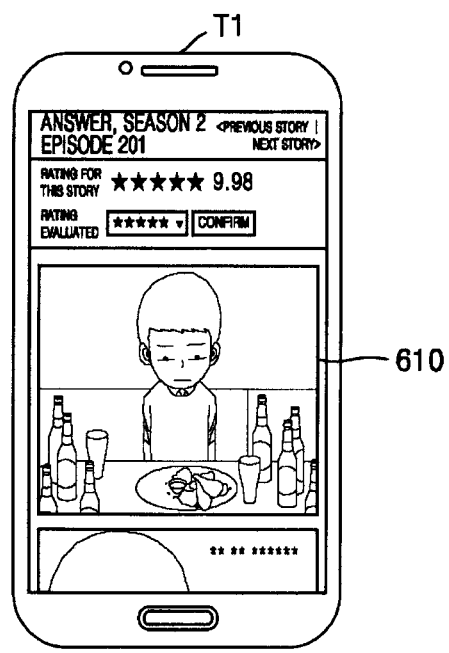

FIGS. 9A-9D and 10A-10D are example diagrams of screens showing cartoon data provided to the user terminal T1 by the cartoon data display device 100 according to another embodiment of the present invention. FIG. 9A shows the first layer 710 (described above), which is a main cut displayed in the display region 610, and FIGS. 9B to 10D show the second to eighth layers 721 to 727 (described above), which are sub cuts displayed in the display region 610 corresponding to the detection results of the first to seventh detection units 121 to 127.

Figure 9B:
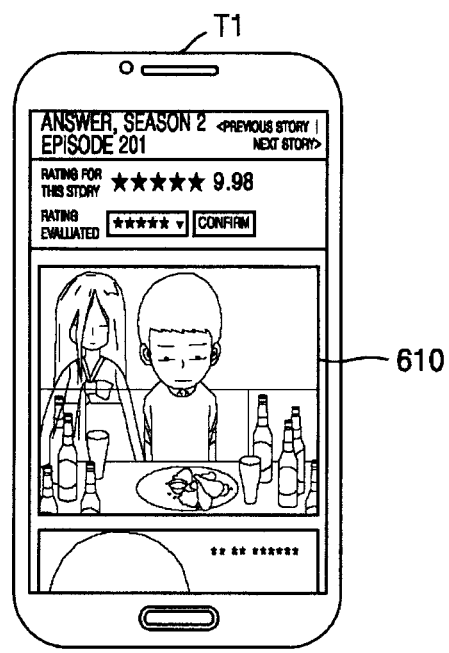
Figure 9C:
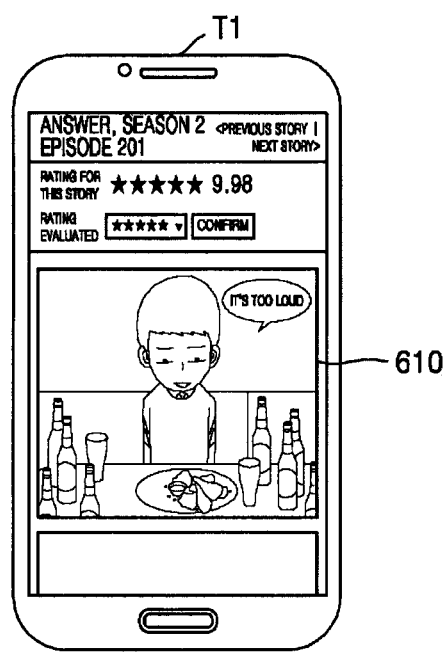
Figure 9D:
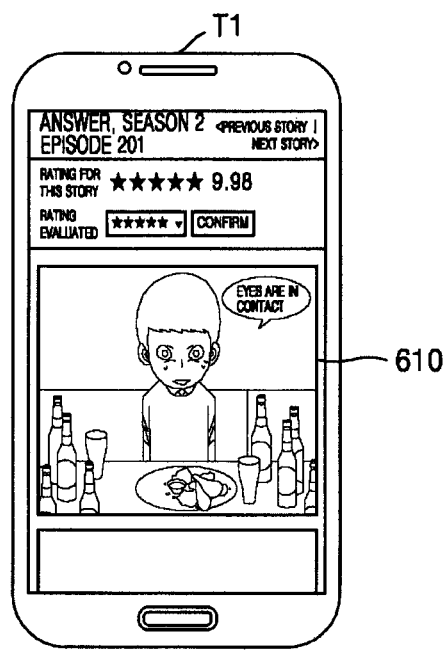

FIG. 9B shows the second layer 721, which is a sub cut displayed in the display region 610, FIG. 9C shows the third layer 722, which is a sub cut displayed in the display region 610, and FIG. 9D shows the fourth layer 723, which is a sub cut displayed in the display region 610.

Figure 10A:
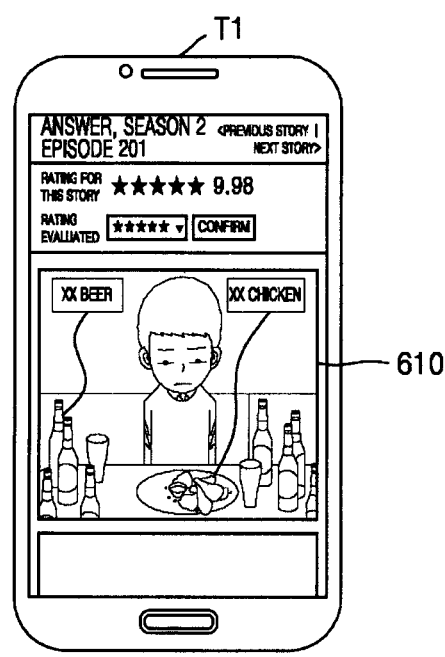
Figure 10B:
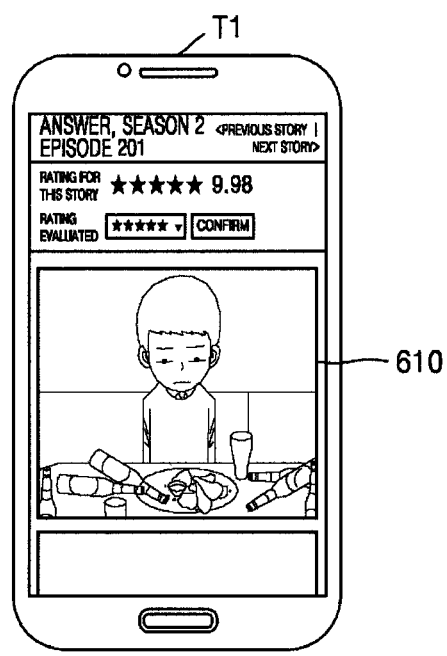
Figure 10C:
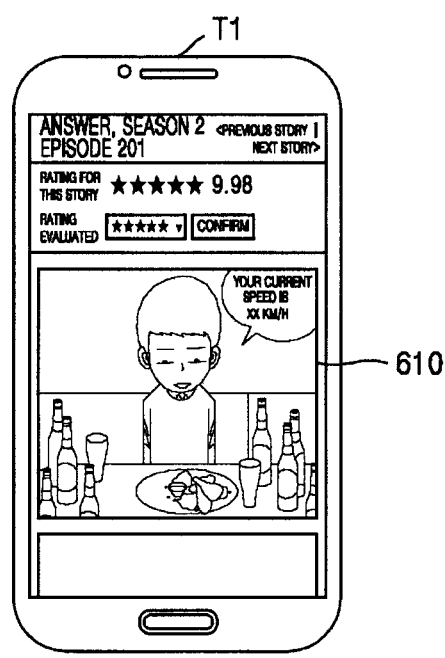
Figure 10D:
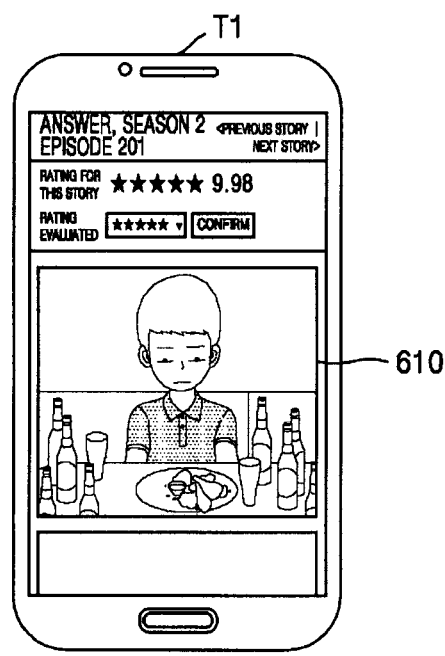

FIG. 10A shows the fifth layer 724, which is a sub cut displayed in the display region 610, FIG. 10B shows the sixth layer 725, which is a sub cut displayed in the display region 610, FIG. 10C shows the seventh layer 726, which is a sub cut displayed in the display region 610, and FIG. 10D shows the eighth layer 727, which is a sub cut displayed in the display region 610.

Figure 11:
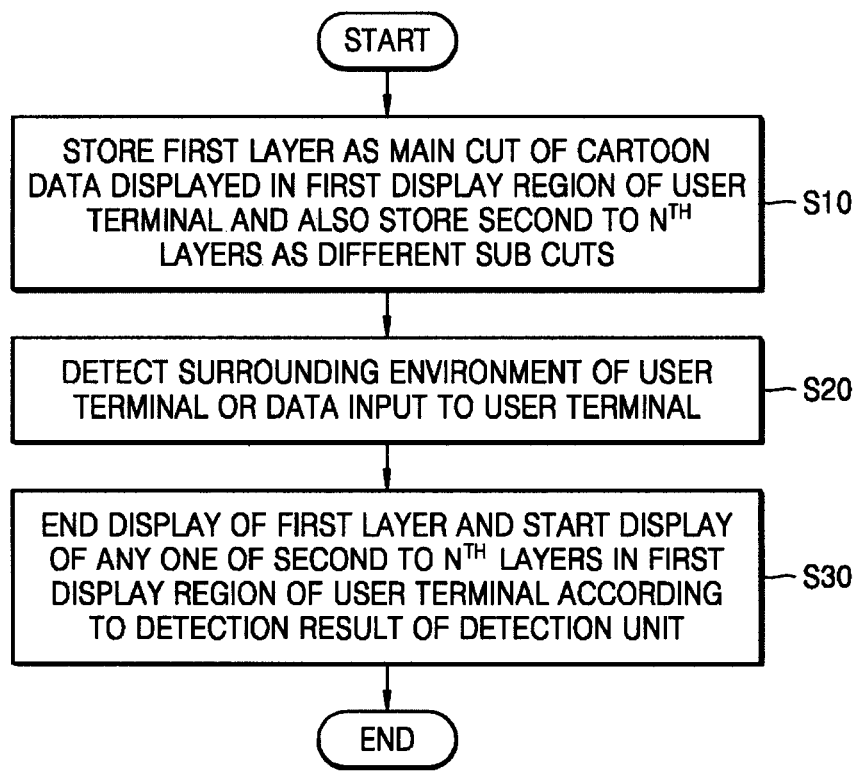
FIG. 11 is a flowchart illustrating a method of displaying cartoon data according to an embodiment of the present invention.

FIG. 11 is a flowchart illustrating a method of displaying cartoon data according to an embodiment of the present invention. In the following description, descriptions of parts that have been described with reference to FIGS. 1 to 10 will be omitted.

Referring to FIG. 11, the cartoon data display device 100 stores a first layer as a main cut of cartoon data displayed in a display region of a user terminal T1 and also stores second to $N^{th}$ layers as different sub cuts, each of which includes one or more stories added to the main cut (S10). As an alternative embodiment, the cartoon data display device 100 may store a first layer as a main cut of cartoon data displayed in a display region of a user terminal T1 and also store second to $N^{th}$ layers as different sub cuts, each of which includes one or more stories to be added to the main cut. That is, each of the first to $N^{th}$ layers may be configured as a single cut displayed in the display region of the user terminal T1, or a result of combining the first layer, which is the main cut, and any one of the second to N$^{th}$ layers, which are the sub cuts, may be configured as a single cut displayed in the display region of the user terminal T1.

The cartoon data display device 100 may detect a surrounding environment of the user terminal or data input to the user terminal T1 (S20). The above-described first to eighth detection units 121-127 may be used to detect the surrounding environment of the user terminal T1 or the data input to the user terminal.

The cartoon data display device 100 may start to display any one of the second to N$^{th}$ layers of the cartoon data in the display region of the user terminal T1 according to a result of detecting the surrounding environment of the user terminal or the data input to the user terminal. As an alternative embodiment, the cartoon data display device 100 may combine and display the first layer and one or more of the second to N$^{th}$ layers in the display region of the user terminal T1 according to the result of detecting the surrounding environment of the user terminal or the data input to the user terminal.

The above-described embodiments of the present invention may be implemented in the form of a computer program or program instruction that is executable through various computer components and recordable on a computer-readable recording medium. Examples of the computer-readable recording medium may include a magnetic medium such as a hard disk, a floppy disk, or a magnetic tape, an optical medium such as a compact disc-read only memory (CD-ROM) or a digital versatile disc (DVD), a magneto-optical medium such as a floptical disk, and a hardware device such as a ROM, a random access memory (RAM), or a flash memory that is specially designed to store and execute program instructions. The computer program or program instruction may be implemented in the form of software or an application and may be transmitted and distributed over the network.

The computer program may be designed and configured specially for the invention, and examples of the computer program include a high-level language code executable by a computer with an interpreter in addition to a machine language code made by a compiler.

The recitation of ranges of values herein is merely intended to serve as a shorthand method of referring individually to each separate value falling within the range unless otherwise indicated herein, and each separate value is incorporated into the specification as if it were individually recited herein.

Also, the steps of the methods described herein can be performed in any suitable order unless otherwise indicated herein or otherwise clearly contradicted by context. The present invention is not limited to the described order of the steps. The use of all examples or exemplary terms (e.g., "etc.," "such as," and "and (or) the like") is merely intended to describe the present invention in detail, and the scope is not necessarily limited by the examples or exemplary terms unless so defined by the claims. Also, one of ordinary skill in the art should appreciate that the present disclosure may be configured through various modifications, combinations, and changes according to design conditions and factors without departing from the scope of the claims and their legal equivalents.

Therefore, the spirit of the present invention is not to be limited by the aforementioned embodiments, and all changes within the claims and their legal equivalents should be construed as being included in the spirit of the present invention.

Embodiments of the present invention relate to a device and method for displaying cartoon data, and may be applicable to a cartoon data display device and method that provide cartoon data having various effects according to a surrounding environment of the user terminal on which the cartoon data is displayed, thereby arousing interest in the cartoon data of a user who is viewing the cartoon data.

The invention claimed is:

1. A cartoon display device for displaying cartoon data, comprising:
    a storage unit configured to store a first layer having a plurality of main cuts of cartoon data to be displayed in a display region of a user terminal, each of the main cuts having cartoon data which is displayed in the display region of the user terminal, and also store second to N$^{th}$ layers including different sub cuts having additional information to be added to at least one of the main cuts of the first layer, the additional information on the sub cuts being different from each other;
    a plurality of detection units, each configured to detect a corresponding one of a plurality of conditions of a surrounding environment of the user terminal, each of the plurality of conditions corresponding to one of the second to N$^{th}$ layers, wherein the plurality of detection units are all activated to set a priority order for the plurality of detection units according to a selection of a user; and
    a control unit configured to display cartoon data of a select main cut of the first layer in the display region of the user terminal, and to select and display additional information of a sub cut of one of the second to N$^{th}$ layers in the display region of the user terminal together with the cartoon data of the select main cut, one of the second to N$^{th}$ layers corresponding to one of the plurality of conditions of the surrounding environment of the user terminal detected by one of the plurality of detection units of the user terminal,
    wherein the additional information of the sub cut of one of the second to N$^{th}$ layers displayed in the display region of the user terminal together with the select main cut is combined based on the priority order established among the plurality of detection units of the user terminal.

2. The cartoon data display device of claim 1, wherein:
    the plurality of detection units comprises a first detection unit configured to detect an illuminance around the user terminal; and
    the control unit displays the second layer in the display region of the user terminal when the illuminance detected by the first detection unit is less than or equal to a reference illuminance.

3. The cartoon data display device of claim 1, wherein:
    the plurality of detection units comprises a second detection unit configured to detect noise around the user terminal; and
    the control unit displays the third layer in the display region of the user terminal when the noise detected by the second detection unit is greater than a reference noise level.

4. The cartoon data display device of claim 1, wherein:
    the plurality of detection units comprises a third detection unit configured to track eyes of a user looking at the user terminal; and
    the control unit displays the fourth layer in the display region of the user terminal when an eye tracking result of the third detection unit is that the eyes of the user are fixed in a reference region on the user terminal.

5. The cartoon data display device of claim 1, wherein:
the plurality of detection units comprises a fourth detection unit configured to detect a gesture of a user input to the user terminal; and
the control unit displays the fifth layer in the display region of the user terminal when a gesture detection result of the fourth detection unit is that the gesture has changed from a first gesture to a second gesture.

6. The cartoon data display device of claim 1, wherein:
the plurality of detection units comprises a fifth detection unit configured to detect a tilt of the user terminal; and
the control unit displays the sixth layer in the display region of the user terminal when the tilt detected by the fifth detection unit is greater than a reference tilt.

7. The cartoon data display device of claim 1, wherein:
the plurality of detection units comprises a sixth detection unit configured to detect an acceleration of the user terminal; and
the control unit displays the seventh layer in the display region of the user terminal when the acceleration detected by the sixth detection unit is greater than a reference acceleration.

8. The cartoon data display device of claim 1, wherein:
the plurality of detection units comprises a seventh detection unit configured to detect a temperature or humidity around the user terminal; and
the control unit displays the eighth layer in the display region of the user terminal when the temperature or humidity detected by the seventh detection unit is greater than a reference temperature or humidity level.

9. A cartoon data display method for displaying cartoon data, comprising:
storing, in a storage unit, a first layer having a plurality of main cuts of cartoon data to be displayed in a display region of a user terminal, each of the main cuts having cartoon data which is displayed in the display region of the user terminal when a corresponding main cut is displayed in the display region of the user terminal, and also storing second to $N^{th}$ layers including different sub cuts having additional information to be added to at least one of the main cuts of the first layer, the additional information on the sub cuts being different from each other;
detecting, by a plurality of detection units, a corresponding one of a plurality of conditions of a surrounding environment of the user terminal, each of the plurality of conditions corresponding to one of the second to $N^{th}$ layers, wherein the plurality of detection units are all activated to set a priority order for the plurality of detection units according to a selection of a user; and
displaying, by a control unit, cartoon data of a select main cut of the first layer in the display region of the user terminal, and to select and display additional information of a sub cut of one of the second to $N^{th}$ layers in the display region of the user terminal together with the cartoon data of the select main cut, one of the second to $N^{th}$ layers corresponding to one of the plurality of conditions of the surrounding environment of the user terminal detected by one of the plurality of detection units of the user terminal,
wherein the additional information of the sub cut of one of the second to $N^{th}$ layers displayed in the display region of the user terminal together with the selection main cut, is combined based on the priority order established among the plurality of detection units of the user terminal.

10. The cartoon data display method of claim 9, wherein:
the detecting the surrounding environment or the input data comprises detecting, by a first detection unit, an illuminance around the user terminal; and
the second layer is displayed in the display region of the user terminal when the illuminance detected by the first detection unit is less than or equal to a reference illuminance.

11. The cartoon data display method of claim 9, wherein:
the detecting the surrounding environment or the input data comprises detecting, by a second detection unit, noise around the user terminal; and
the third layer is displayed in the display region of the user terminal when the noise detected by the second detection unit is greater than a reference noise level.

12. The cartoon data display method of claim 9, wherein:
the detecting the surrounding environment or the input data comprises tracking, by a third detection unit, eyes of a user looking at the user terminal; and
the fourth layer is displayed in the display region of the user terminal when an eye tracking result of the third detection unit is that the user's eyes are fixed in a reference region on the user terminal.

13. The cartoon data display method of claim 9, wherein:
the detecting the surrounding environment or the input data comprises detecting, by a fourth detection unit, a gesture of a user input to the user terminal; and
the fifth layer is displayed in the display region of the user terminal when a gesture detection result of the fourth detection unit is that the gesture has changed from a first gesture to a second gesture.

14. The cartoon data display method of claim 9, wherein:
the detecting the surrounding environment or the input data comprises detecting, by a fifth detection unit, a tilt of the user terminal; and
the sixth layer is displayed in the display region of the user terminal when the tilt detected by the fifth detection unit is greater than a reference tilt.

15. The cartoon data display method of claim 9, wherein:
the detecting the surrounding environment or the input data comprises detecting, by a sixth detection unit, a movement state of the user terminal; and
the seventh layer is displayed in the display region of the user terminal when the acceleration detected by the sixth detection unit is greater than a reference acceleration.

16. The cartoon data display method of claim 9, wherein:
the detecting the surrounding environment or the input data comprises detecting; by a seventh detection unit, a temperature or humidity around the user terminal; and
the eighth layer is displayed in the display region of the user terminal when the temperature or humidity detected by the seventh detection unit is greater than a reference temperature or humidity level.

17. A non-transitory computer readable recording medium storing a computer program for displaying cartoon data, the computer program enabling a computer to execute the steps comprising:
storing, in a storage unit, a first layer having a plurality of main cuts of cartoon data to be displayed in a display region of a user terminal, each of the main cuts having cartoon data which is displayed in the display region of the user terminal when a corresponding main cut is displayed in the display region of the user terminal, and also storing second to Nth layers including different sub cuts having additional information to be added to at least one of the main cuts of the first layer, the additional information on the sub cuts being different from each other;

detecting, through a plurality of detection units, a corresponding one of a plurality of conditions of a surrounding environment of the user terminal, each of the plurality of conditions corresponding to one of the second to $N^{th}$ layers, wherein the plurality of detection units are all activated to set a priority order for the plurality of detection units according to a selection of a user; and displaying cartoon data of a select main cut of the first layer in the display region of the user terminal, and to select and display additional information of a sub cut of one of the second to $N^{th}$ layers in the display region of the user terminal together with the cartoon data of the select main cut, one of the second to $N^{th}$ layers corresponding to one of the plurality of conditions of the surrounding environment of the user terminal detected by one of the plurality of detection units of the user terminal, wherein the additional information of the sub cut of one of the Nth layers displayed in the display region of the user terminal together with the select main cut, is combined based on the priority order established among the plurality of detection units of the user terminal.

* * * * *